United States Patent

Ueyama et al.

[11] 4,102,483
[45] Jul. 25, 1978

[54] METHOD FOR FEEDING A WELDING WIRE

[75] Inventors: Fumio Ueyama, Ikoma; Tadashi Hattori, Takarazuka, both of Japan

[73] Assignee: Osaka Denki Co., Ltd., Osaka, Japan

[21] Appl. No.: 665,678

[22] Filed: Mar. 11, 1976

[30] Foreign Application Priority Data

| Mar. 13, 1975 | [JP] | Japan | 50-30963 |
| Mar. 13, 1975 | [JP] | Japan | 50-30964 |
| Mar. 13, 1975 | [JP] | Japan | 50-30965 |

[51] Int. Cl.$^2$ .............................................. B23K 9/12
[52] U.S. Cl. .................................... 228/244; 226/1; 226/196; 219/137.51
[58] Field of Search .............. 228/41, 244; 219/73 R, 219/73 A, 131 F, 136, 137; 226/188, 196, 1

[56] References Cited

U.S. PATENT DOCUMENTS

| 1,966,200 | 7/1934 | Eskilson | 228/244 |
| 3,240,233 | 3/1956 | Johnston | 219/136 X |
| 3,279,669 | 10/1966 | Bernard et al. | 226/196 X |
| 3,358,115 | 12/1967 | Arnoldy | 219/73 R X |
| 3,576,966 | 5/1971 | Sullivan | 219/125 R X |
| 3,866,015 | 2/1975 | Matsumoto et al. | 219/73 R X |

Primary Examiner—Al Lawrence Smith
Assistant Examiner—K. J. Ramsey
Attorney, Agent, or Firm—Flynn & Frishauf

[57] ABSTRACT

A welding wire feed method and apparatus involves feeding a welding wire in a conduit cable to a workpiece, while maintaining it normally in one plane in the form of a sine curve in the conduit cable.

4 Claims, 24 Drawing Figures

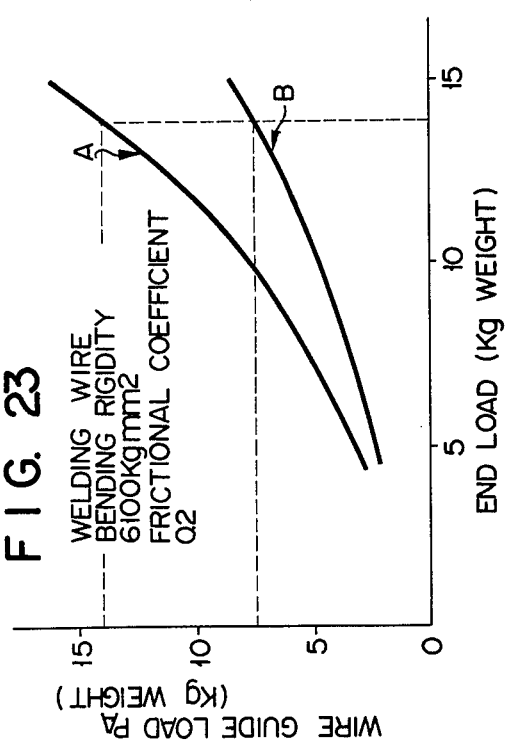
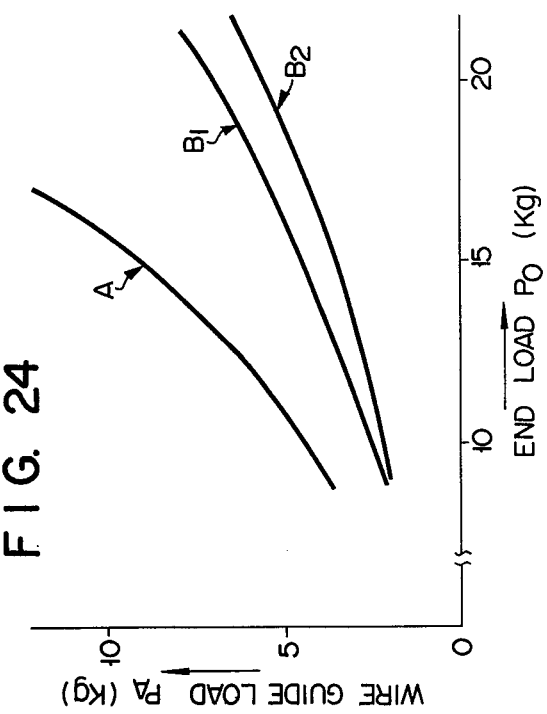
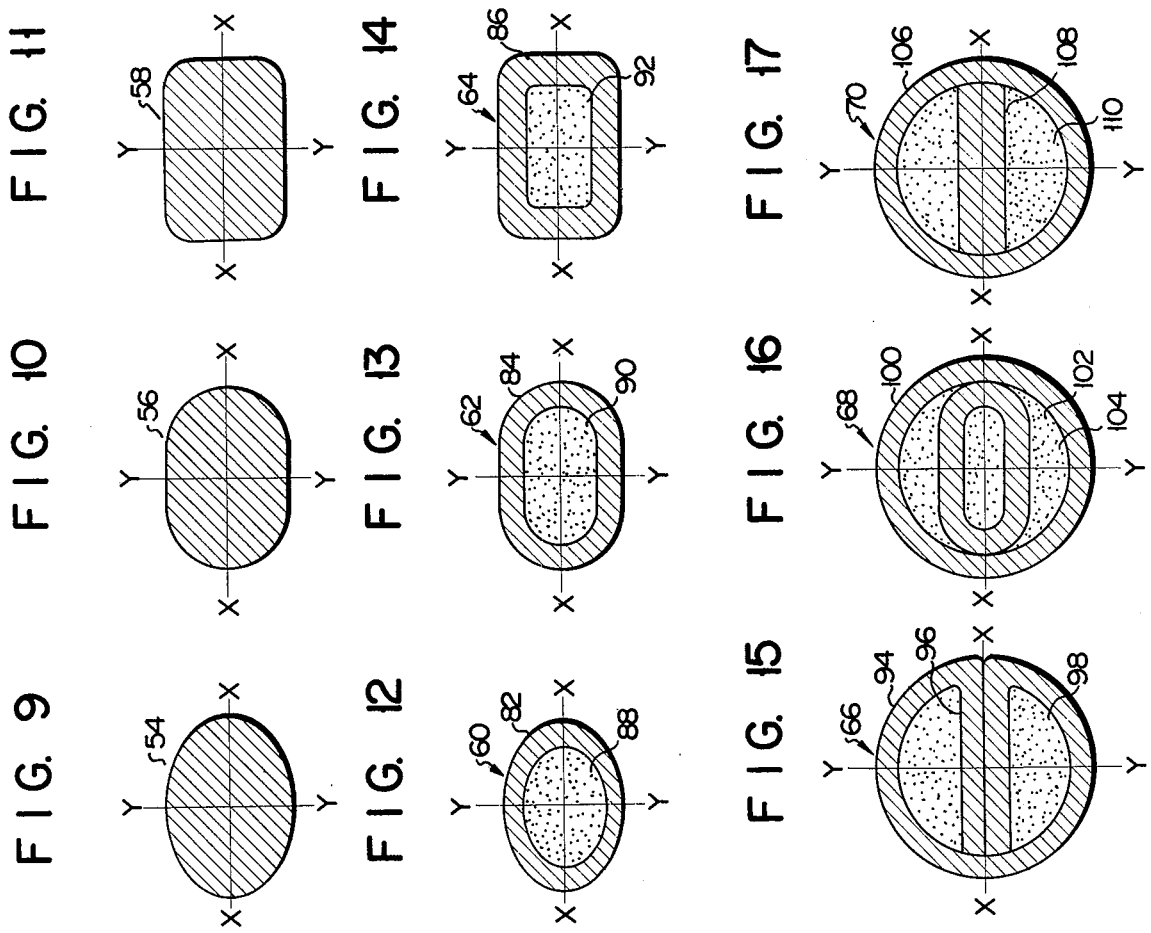

METHOD FOR FEEDING A WELDING WIRE

BACKGROUND OF THE INVENTION

This invention relates to a method and apparatus for feeding a welding wire. Generally when an automatic welding is effected, it is necessary to feed a welding wire to a welding portion of a workpiece. It is necessary to feed an electrode wire in a consumable electrode type automatic arc welding such as a $CO_2$ gas arc welding, submerged arc welding etc., and an additive wire in a nonconsumable electrode type automatic arc welding such as a TIG arc welding etc. and an automatic electroslag welding, to a welding portion of a workpiece. The welding wire is usually fed toward the workpiece by inserting the wire through a wire guide axial bore of a conduit cable connected at a wire exit end thereof to a welding torch and imparting a wire feed force from a wire supply roll mechanism to the wire at the wire entry end of the conduit cable. In the conventional welding wire feed method, however, the welding wire is fed normally in a spiral state along the inner surface of a wire guide hole of a conduit cable. In this case the welding wire is circular in cross section and has an equal bending rigidity in all directions represented by horizontal and vertical axes passing through an axis thereof, and the conduit cable has a wire guide bore of a circular cross section, the inner diameter of which is sufficiently larger than an outside diameter of the welding wire. The welding wire is subjected during the feeding operation to an end load $P_O$ when it is passed through a welding torch section and a feed force $P_F$ from a wire supply roll mechanism and the wire is buckled in the wire guide bore of the conduit cable, causing it to be spirally curved along the inner surface of the conduit cable. For this reason, the welding wire is slidably moved in a circumferential direction along the inner surface of the wire guide bore of the conduit cable and during the sliding movement of the welding wire a frictional resistance is applied as a wire guide load $P_A$ to the welding wire. As a result, the welding wire is maintained normally in a predetermined, spirally curved state by a force relation between a feed force and a feed load $P_O + P_A$. The wire guide load $P_A$ is increased with an increasing end load $P_O$ and in proportion to the length of the conduit cable, preventing provision of a low-output, and thus compact, wire feed roll mechanism. Furthermore, a smooth, stable feeding of the welding wire is prevented. In order to alleviate the wire guide load $P_A$, attempts have been made in the art to make a frictional resistance of the welding wire to the inner surface of the wire guide bore smaller by, for example, applying a lubricant to the inner surface of the wire guide bore of the conduit cable, but with partial success.

SUMMARY OF THE INVENTION

This invention provides a method for feeding a welding wire to a workpiece, while maintaining is normally in one plane in the form of a sine curve along the inner surface of a wire guide bore of a conduit cable, to greatly reduce a contact area of the welding wire to the inner surface of the wire guide bore as compared with a contact area involved in a conventional method and in consequence greatly reduce a wire guide load resulting from a frictional resistance which is proportional to the contact area.

A primary object of this invention is to provide a method for smoothly and stably feeding a welding wire in a conduit cable toward a workpiece with a greatly reduced wire guide load and in consequence a relatively small wire feed force.

Another object of this invention is to rpovide a welding wire feed apparatus capable of smoothly and stably feeding a welding wire in a conduit cable toward a workpiece with a relatively small feed force i.e. through a comparatively small wire feed roll mechanism and capable of using a simple arrangement substantially similar to a conventional arrangement.

Another object of this invention is to provide a welding wire feed apparatus for a welding wire capable of being smoothly and stably fed toward a workpiece with a relatively small feed force using a conventional welding apparatus.

The other objects and advantages will be apparent from the following descriptions.

BRIEF DESCRIPTION OF THE DRAWING

FIGS. 9 to 17 are cross-sectional views each showing a different welding wire according to this invention;

FIGS. 23 and 24 each show a characteristic curve showing a relation between an end load and a wire guide load when comparison is made between the conventional method and the method according to this invention.

DETAILED DESCRIPTION OF THE PREFERRED EMBODIMENTS

Figure 1:
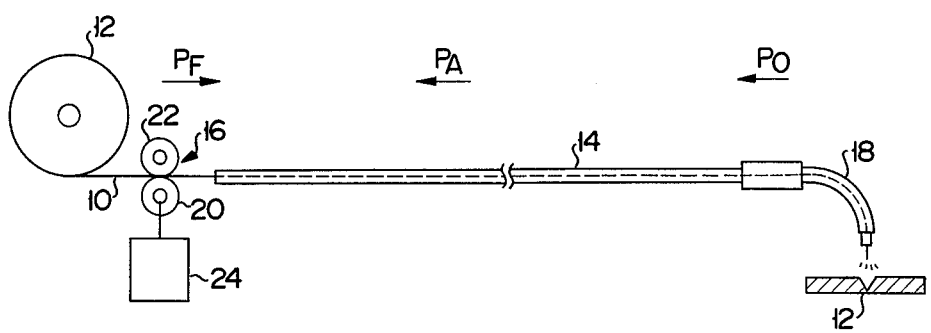
FIG. 1 is a diagrammatic view showing a welding wire feed apparatus for the practice of this invention.
Figure 2:
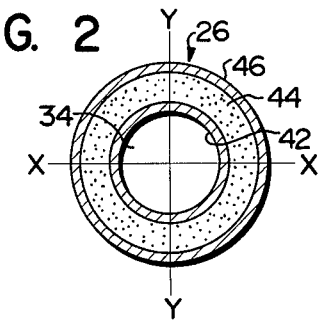
FIG. 2 is a cross-sectional view showing a conventional conduit cable.
Figure 3:
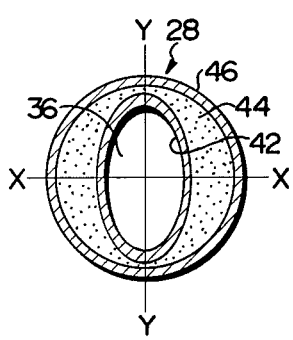
FIGS. 3 to 5 are cross-sectional views each showing a different conduit cable according to this invention.
Figure 4:
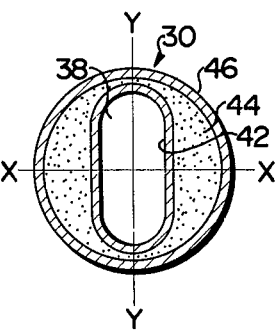
Figure 5:
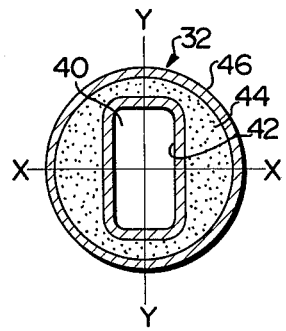

FIG. 1 shows a welding wire feed apparatus used in the practice of this invention. The wire feed apparatus comprises a wire reel on which a welding wire 10 is wound, a conduit cable 14 for guiding the welding wire toward a welding portion of a workpiece 12, and a wire supply roll unit 16 for imparting a feed force $P_F$ to the welding wire at the welding wire entry side of the conduit cable 14. A welding torch 18 is connected to the welding wire exit end of the conduit cable. The wire feed roll unit 16 comprises a drive roll 20 and compression roll 22 between which the welding wire 10 is sandwiched, and an electric motor 24 for rotating the drive and compression rolls. FIGS. 2 to 5 show the cross section of each of various conduit cables used for the wire feed apparatus. FIG. 2 shows a conventional conduit cable 26, while FIGS. 3 to 5 show conduit cables 28 to 30, respectively, according to this invention. In the conventional conduit cable 26 shown in FIG. 2 an axial wire guide bore 34 is circular in cross section and has an inner diameter sufficiently larger than the outer diameter of the welding wire. In the conduit cables 28, 30 and 32 according to this invention axial wire guide bores 36, 38 and 40 each have a narrow inner dimension portion in an X—X direction which is somewhat larger than the outer diameter of the welding wire, and a wide inner dimension portion in a Y—Y direction which is sufficiently larger than the outer diameter of the welding wire, the X—X and Y—Y lines passing through an axis of the conduit cable. That is, the wire guide bore 36 of the conduit cable 28 is elliptical in cross section, the wire guide bore 38 of the conduit cable 30 has a flat oval cross section, and the wire guide bore 40 of the conduit cable 32 is substantially rectangular in cross section. Each of the conduit cables 26, 28 and 32 consists of a wire guide tube 42, a reinforced material 44, such as an electrical insulating material, covered on the outer periphery of the wire guide tube 42 and an outer sheath 46 covered on the outer periphery of the reinforced material 44. As the wire guide tube 42 use is made of a tube formed by tightly winding a small diameter steel wire in a coil spring fashion or a tube which is molded of synthetic resin.

Figure 6:
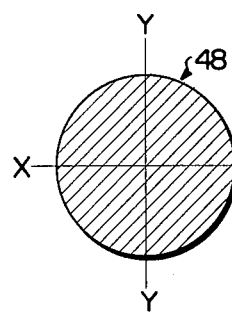
FIGS. 6 to 8 are cross-sectional views each showing a conventional different welding wire.
Figure 7:
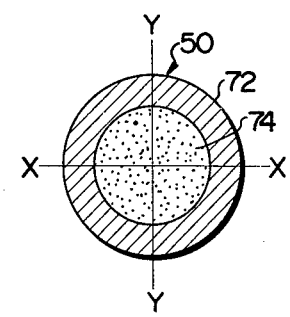
Figure 8:
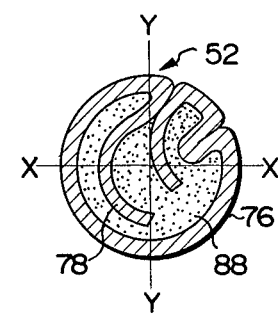

FIGS. 6 to 17 show a cross section of each of various welding wires used in the practice of this invention. FIGS. 6 to 8 show conventional welding wires 48, 50 and 52, while FIGS. 9 to 17 show welding wires 54, 56, 58, 60, 62, 64, 66, 68 and 70 according to this invention. The welding wire 48 is a solid bore wire and the welding wires 50 and 52 are flux-cored wires. The welding wire 50 consists of a flux core 74 and a metal sheath 72 covered on the outer surface of the flux core 74, and the welding wire 52 consists of a flux core 80 and a metal sheath 76 which is partially bent into the flux core 80. Although these welding wires 48, 50 and 52 are different in construction from each other, they are all circular in cross section. The welding wires 48, 50 and 52 are so formed that the cross-sectional secondary moments, i.e. bending rigidity, to all directions represented by a horizontal axis X—X and vertical axis Y—Y through an axis of the wire are substantially equal. The welding wires 54, 56 and 58 are solid wires and the welding wires 60, 62, 64, 66, 68, 70 are flux-cored wires. The welding wires 60, 62 and 64, each, consist of a core flux (88, 90, 92) and a metal sheath (82, 84, 86). The welding wire 66 is so formed that a metal sheath 94 is bent into a circular form with both the bent metal belt 96 thereof extending in the horizontal direction X—X of the welding wire and abutted against the inner surface of the metal sheath, as shown in FIG. 15, with a flux filled in the spaces. The welding wire 68 consists of, as shown in FIG. 16, an outer hollow metal sheath 100, an inner somewhat flatted hollow metal band 102 extending in a horizontal direction X—X through an axis of the welding wire 68 and a flux 104 filled in a space in an axial bore of the metal band 102 and a space between the metal sheath 100 and the metal band 102. The welding wire 70 consists of a circular hollow metal sheath 106, a solid metal band 108 extending in a horizontal direction X—X of the welding wire and passing through an axis of the welding wire with both the longitudinal side edge thereof abutted agnist the inner surface of the metal sheath 106, and a flux 110 inserted in spaces each provided between the metal sheath 106 and the metal band 108. The welding wires 54, 56, 58, 60, 62 and 64 have a somewhat elongated configuration which is wide in a horizontal direction X—X and narrow in a vertical direction Y—Y of the welding wire, the horizontal line X—X and vertical line Y—Y passing through an axis of each welding wire. To explain more in detail, the welding wires 54 and 60 are elliptical in cross section, the welding wires 56 and 62 has a flat oval cross section and the welding wires 58 and 64 are rectangular in cross section. These welding wires 54, 56, 58, 60, 62 and 64 have a different bending rigidity when viewed in the horizontal direction X—X and vertical direction Y—Y. The welding wires 66, 68 and 70, viewed in the horizontal direction X—X and vertical direction Y—Y, display a different bending rigidity due to the presence of the metal bands 96, 102 and 108.

Explanation will now be made of the case where the conventional wire 48 in FIG. 6 is used in the welding wire feed apparatus equipped with the conventional conduit cable 26 in FIG. 2.

Figure 19:
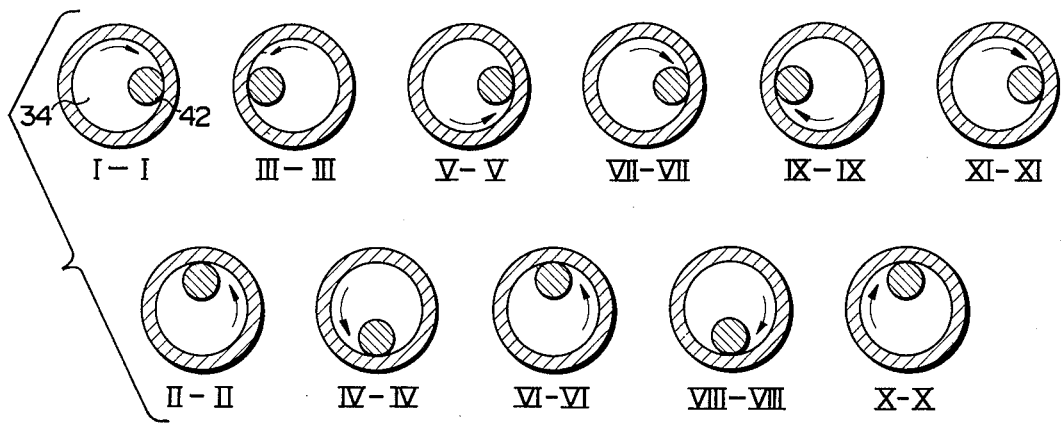
FIG. 19 is a cross-sectional view showing the conduit cable and welding wire of FIG. 8 in different positions I to XI.
Figure 20:
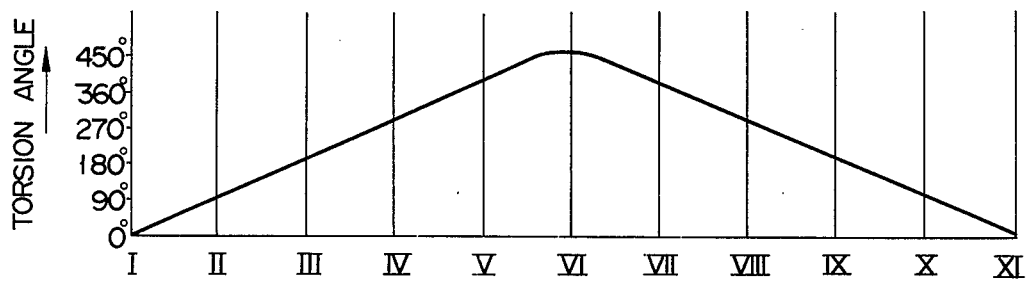
FIG. 20 is a characteristic curve showing a torsion angle of the welding wire of FIG. 18 in the different positions I to XI.

The welding wire 48 supplied normally in a curved state is guided through the wire guide bore 34 of the conduit cable 26 and it is fed in a spiral fashion along the inner surface of the wire guide bore 34. For ease in understanding the normally curved state of the welding wire 48 in the wire guide bore 34 the wire guide bore 34 is shown shortened in FIG. 18 with the inner diameter of the wire guide bore exaggerated with respect to the diameter of the welding wire. FIG. 19 shows the cross sections of the welding wire 48 in positions I, II . . . XI of the conduit cable for ease in understanding the spiral state of the welding wire 34. FIG. 20 shows a torsion angle with the position I of the welding wire 48 as a reference.

Explanation will now be made of the case where the conventional wire 48 in FIG. 6 is used in the wire feed device in FIG. 1 equipped with the conduit cable 30 according to this invention.

Figure 21:
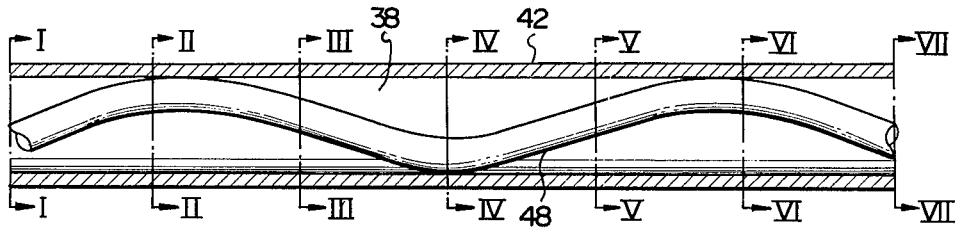
FIG. 21 shows on a reduced scale a curved state of a welding wire in a wire guide bore of a conduit cable when a method according to this invention is used.
Figure 22:
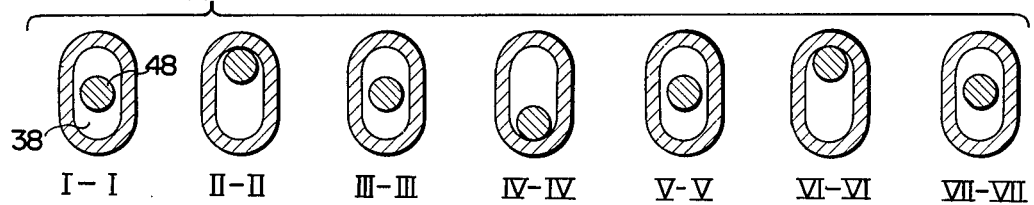
FIG. 22 is a cross-sectional view showing cross sections of the welding wire in different positions I to VII in FIG. 21.

When the welding wire 48 is fed through the wire guide bore 38 of the conduit cable 30 it is buckled by a force relation between a wire feed force $P_F$ and a wire end load $P_O$. Since, however, the welding wire 48 is allowed to be curved only in the vertical direction Y—Y of the conduit cable 30 due to the wire guide hole 38 of the conduit cable 30 being elongated in the vertical direction Y—Y of the conduit cable 30, it is not spirally curved in the horizontal direction X—X of the conduit cable and it is bent in one plane in the form of a sine curve. In consequence, the welding wire 48 in the wire guide hole 38 of the conduit cable 30 is maintained curvy in one plane normally in the form of a sine curve. FIG. 21 illustratively shows the normal curved state of the welding wire 48 in the wave guide bore 38 of the conduit cable 30 as in FIG. 18. FIG. 22 shows the cross sections of the welding wire 48 in positions I, II . . . VII of the conduit cable 30 for ease in understanding the sine-curved state of the welding wire 48 which extends in one plane in the wave guide hole 38 of the conduit cable 30. The same thing is also applied to the welding wires 50 and 52 and the same result is also obtained in the case of the conduit cables 28 and 32. The same is again true of the case where the welding wires 54, 56, 58, 60, 62, 64, 66, 68 and 70 are fed through the wire guide bore of the conduit wire. That is, even when use is made of the conduit cable 26 whose wire guide bore is permitted to be spiral curved both in the horizontal (X—X) and vertical (Y—Y) directions of the conduit cable, the welding wires 54, 56, 58, 60, 62, 64, 66, 68 and 70 according to this invention are curved only in the direction in which it tends to be bent and in consequence these welding wires per se assume a sine curve substantially in one plane in the wire guide bore of the conduit cable 26 due to their own directionality.

Figure 18:
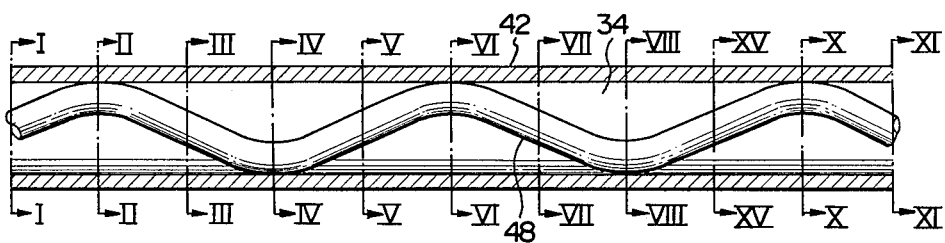
FIG. 18 shows on a reduced scale a spirally curved state of a welding wire in a wire guide bore of a conduit cable when a conventional method is used.

In FIG. 18 the welding wire is spirally curved in the wire guide bore of the conduit cable 30 with the whole length thereof in contact with the inner surface of the conduit cable 30. In FIG. 21, however, the welding wire is curved substantially in one plane in the form of a sine curve in the wire guide bore of the conduit cable with each crest only of the sine-curved wire in contact with the inner surface of the conduit cable. When a contact area of the welding wire to the inner surface of the conduit cable is compared, the welding wires according to this invention have a less contact area than that of the conventional ones and in consequence it has a less frictional resistance and less wire guide load.

For comparison, experiments were conducted between the conventional method and the method according to this invention. The experiment were carried out under substantially the same conditions taking into consideration dynamic properties such as the end load $P_O$, dimensional relation between the wire guide bore of the conduit cable and the welding wire, bending rigidity, torsional rigidity etc. as well as a frictional coefficient between the surface of the welding wire and the inner surface of the wire guide bore of the conduit cable, the length and posture of the wire guide bore of the conduit cable and so on. It is because that the actual curved state of the welding wire is related to these factors.

EXPERIMENT 1

A welding wire was fed through a wire guide bore of the conduit cable with a length of 3m, which was horizontally disposed, to cause the end load $P_O$ to vary and at this time a wire guide load $P_A$ was measured. Use was made of a bore wire (i.e. a welding wire in FIG. 6), circular in cross section, having dynamic properties such as a bending rigidity of 6100 $kgmm^2$ and a frictional coefficient of 0.2. In the conventional method, use was made of a conduit cable having a bore, circular in cross section, whose inner diameter is 5 mm. According to this invention, however, use was made of a conduit cable having a bore of a flat oval cross section with a horizontal width of 3 mm and vertical width of 5 mm. When, for example, the end load $P_O$ was 14 kg, the wire guide load $P_A$ was 14 kg in the case of the conventional method and 7.5 kg in the case of the method according to this invention. According to this invention, therefore, the wire guide load was reduced to substantially one half.

EXPERIMENT 2

A 3m conduit cable in FIG. 2 having a bore, circular in cross section, whose internal diameter was 4.0 mm was horizontally placed in a straight line and a welding wire was fed through the bore of the conduit cable to cause the end load $P_O$ to vary and at this time the wire guide load $P_A$ was measured. In the conventional method, use was made as a welding wire of a FIG. 7 flux-cored wire, circular in cross section, of about 2.0 mm in outer diameter which had a frictional coefficient of about 0.22 to 0.24 to the inner surface of the wire guide and a bending rigidity of about 6200 $kgmm^2$. According to this invention, use was made as a welding wire of a FIG. 12 flux-cored wire, ellictical in cross section, which had a A:B ratio of 1.4 (A: a major axis, B: a minor axis) and with a bending rigidity of about 6000 $kgmm^2$ in the minor axis direction and about 11000 $kgmm^2$ in the major axis direction of the eliptical cross section wire.

EXPERIMENT 3

The same experiment as in Experiment 2 was conducted except that use was made in this invention of a FIG. 17 flux-cored wire, circular in cross section, of about 2.0 mm in outer diameter which had a frictional coefficient of about 0.22 to 0.24 to the inner surface of a wire guide hole and a bending rigidity of about 10300 $kgmm^2$ in a horizontal direction X—X and about 6100 $kgmm^2$ in a vertical direction of the circular cross section wire.

When an end load $P_O$ was, for example, 15 kg, a wire guide load was 9 kg in the conventional method, 4.5 kg in the case of the FIG. 12 flux-cored wire in Experiment 2 and 3.6 kg in the case of FIG. 17 flux-cored wire in Experiment 3. According to this invention, therefore, the wire guide load was reduced to about one half as compared with the wire guide load involved in the conventional FIG. 7 flux-cored wire.

As shown in FIG. 23, when the end load $P_O$ is increased, the wire guide load $P_A$ tends to be rapidly increased as shown in the curve A (conventional method). According to this invention, however, the wire guide load $P_A$ is slowly increased, as shown in the curve B, with an increase of the wire guide load $P_A$, and pronounced effects are found to be obtained in this invention (Experiment 1) when the end load $P_O$ is increased. The substantially same results were also obtained in Experiments 2 and 3 as shown in FIG. 24 where a curve $B_1$ denotes a characteristic curve of the FIG. 12 flux-cored wire and a curve $B_2$, that of the FIG. 17 flux-cored wire.

What we claim is:

1. A method for feeding a welding wire comprising:
    feeding a substantially straight welding wire having a substantially circular cross-section to an elongated conduit cable having a wire guide bore with an elongated cross-section, said conduit cable having a wire exit end coupled to a welding torch, and
    continuously imparting a feeding force to the straight welding wire at the wire entry side of the conduit cable to cause the straight welding wire to deform in said elongated cross-section of said bore into the form of a sine curve in one plane and in the axial direction of said bore due to the co-relation of said feeding force on said wire and a force applied at the tip end of said wire by said welding torch at said exit end.

2. Method according to claim 1, wherein said feeding step comprises feeding said substantially straight welding wire to an elongated conduit cable having a wire guide bore of substantially oval cross-section.

3. Method according to claim 1, wherein said feeding step comprises feeding said substantially straight welding wire to an elongated conduit cable having a wire guide bore of substantially rectangular cross-section.

4. Method according to claim 1, wherein said feeding step comprises feeding said substantially straight welding wire to an elongated conduit cable having a wire guide bore of substantially elliptical cross-section.

* * * * *